United States Patent
Jiang

(10) Patent No.: US 8,258,778 B2
(45) Date of Patent: Sep. 4, 2012

(54) SIMPLIFIED MICRO-MAGNETIC SENSOR FOR ACCELERATION, POSITION, TILT, AND VIBRATION

(75) Inventor: Xu Hua Jiang, San Jose, CA (US)

(73) Assignee: Lustone Technology, Inc., San Jose, CA (US)

( * ) Notice: Subject to any disclaimer, the term of this patent is extended or adjusted under 35 U.S.C. 154(b) by 264 days.

(21) Appl. No.: 12/859,262

(22) Filed: Aug. 19, 2010

(65) Prior Publication Data

US 2011/0309825 A1 Dec. 22, 2011

Related U.S. Application Data

(63) Continuation-in-part of application No. 12/819,193, filed on Jun. 19, 2010.

(51) Int. Cl.
*G01R 7/14* (2006.01)

(52) U.S. Cl. ............... 324/207.15; 324/234; 324/260

(58) Field of Classification Search .................. None
See application file for complete search history.

(56) References Cited

U.S. PATENT DOCUMENTS 7,420,362 B2 * 9/2008 Gurich et al. ............ 324/207.24
7,705,585 B2 * 4/2010 Howard .................... 324/207.17

* cited by examiner

*Primary Examiner* — Jermele M Hollington
*Assistant Examiner* — Trung Nguyen
(74) *Attorney, Agent, or Firm* — Chein-Hwa Tsao; CH Emily LLC

(57) ABSTRACT

A simplified micro-magnetic based sensor and a system built with it for detecting or measuring acceleration, speed, position, placement, tilt, and vibration are disclosed for a reduced product size, simplified manufacturing process, and reduced product cost. Both simplified micro-magnetic sensor and simplified micro-magnetic sensor system include a primary micro inductor and a secondary micro inductor coupled with a micro magnetically permeable dynamic medium element that is small, simple and low cost to manufacture.

8 Claims, 2 Drawing Sheets

Simplified Micro-magnetic Sensor Head for Acceleration, Position, Tile, and Vibration Further Simplified Micro-magnetic Sensor Head for Vibration

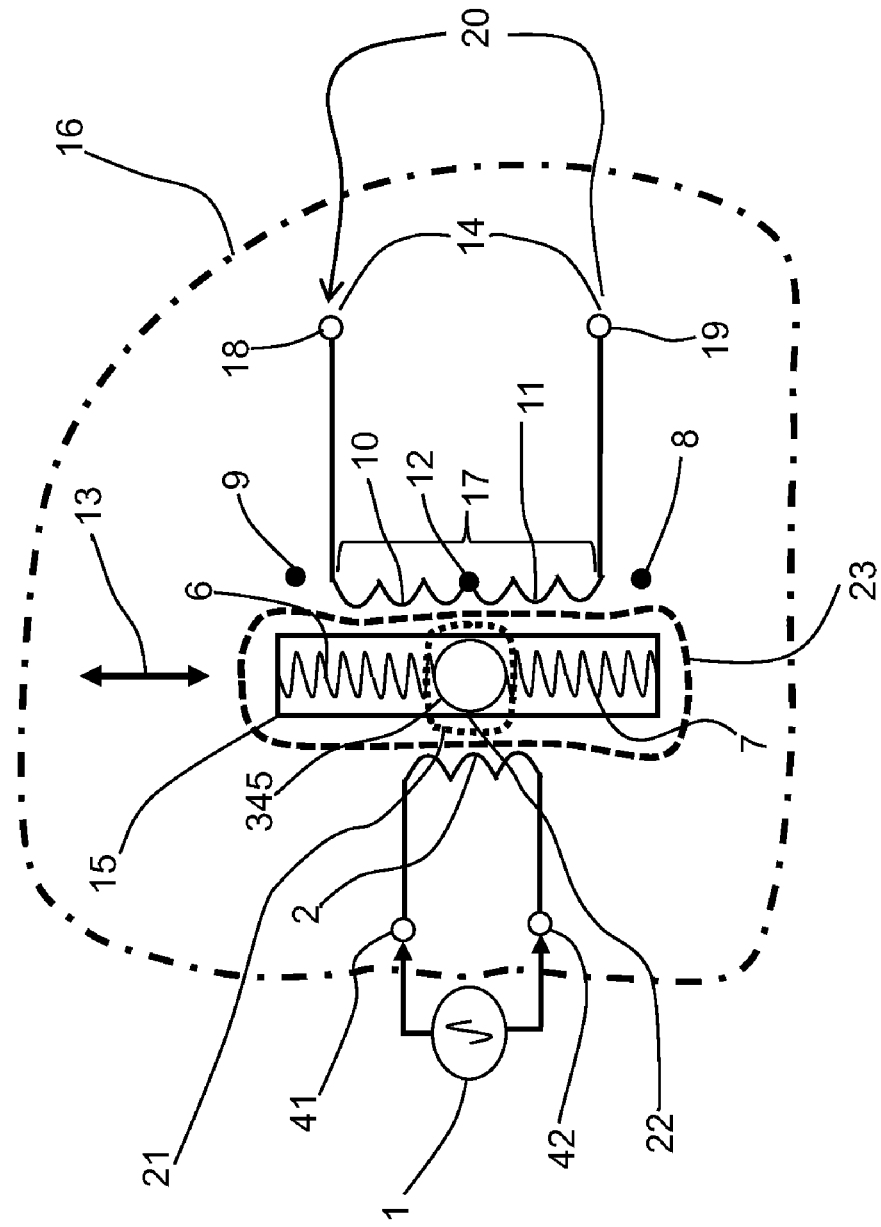
Figure 1A. Simplified Micro-magnetic Sensor Head for Acceleration, Position, Tile, and Vibration

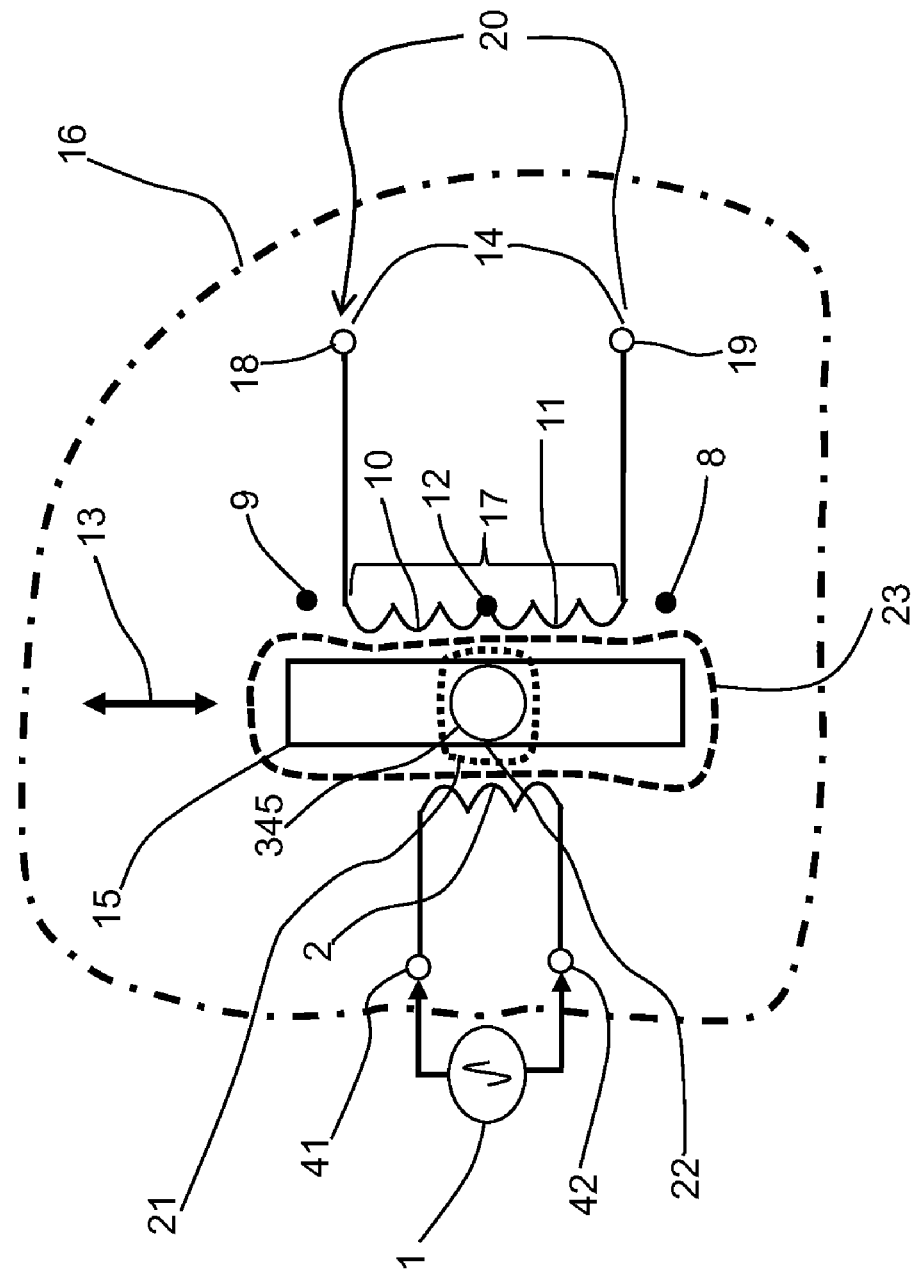
Figure 1B. Further Simplified Micro-magnetic Sensor Head for Vibration

SIMPLIFIED MICRO-MAGNETIC SENSOR FOR ACCELERATION, POSITION, TILT, AND VIBRATION

CROSS REFERENCE TO RELATED APPLICATIONS

This patent application is a continuation-in-part (CIP) of a previously filed pending U.S. patent application entitled "Micro-Magnetic Sensor for Acceleration, Position, Tilt, and Vibration", of application Ser. No. 12/819,193 and filing date of Jun. 19, 2010 by Xu Hua Jiang whose content is herein incorporated by reference for any and all purposes.

FIELD OF INVENTION

This invention relates generally to the field of sensors for acceleration, displacement, tilt, or vibration, aka accelerometers, by generating electronic signal variation corresponding to position variation and speed variation. More specifically, the present invention is directed to a technique and associated device structure capable of detecting acceleration, position, tilt, and vibration of a matter.

BACKGROUND OF THE INVENTION

Known prior arts of magnetic field sensors include the Hall-effect sensor and the electro dynamic transducer. The manufacturing process of Hall-effect sensors is complicated and costly. Due to its required large sizes, it is not practical to scale the electro dynamic transducers down into micro electromechanical system (MEMS) like semiconductor dimensions as desired by many modern electronic products and systems.

SUMMARY OF THE INVENTION

A simplified micro magnetic sensor (MMS) for acceleration, displacement, tilt, and vibration is proposed. The MMS includes:
 a). A primary winding with two input terminals.
 b). A secondary winding with two differential output terminals.
 c). A magnetically permeable dynamic medium element (MPDME) placed near both the primary winding and the secondary winding so as to effect a transformer coupling between them.
 d). An external single frequency drive signal source connected to the primary input terminals.
As a result, the simplified MMS generates a phase-based differential output signal (PDOS) that responds to an MPDME movement due to a motion such as acceleration, position variation, tilt variation, or vibration.

In an embodiment, the MPDME includes:
 a). A sealed nonmetallic coil tube enclosed by both the primary winding and the secondary winding but insulated from them.
 b). A single-piece sensor core disposed inside the coil tube for a free sliding movement along its axis under an inertial force. The single-piece sensor core is made of a magnetic medium element; hence the single-piece sensor core is a movable magnetic medium (MMM).

In a more specific embodiment with the application of an external single frequency drive signal source, the primary winding is configured to enclose the coil tube along a virtual axis that passes through the two ends of the coil tube.

In a more specific embodiment with the generation of the PDOS, the secondary winding is configured to have two oppositely wound but otherwise identical sub-windings secondary sub-winding A (SSW-A) and secondary sub-winding B (SSW-B) symmetrically joined at a central winding point (CWP). The other free end of SSW-A defines a secondary differential output terminal one (SDOT-1) and the other free end of SSW-B defines a secondary differential output terminal two SDOT-2. Like the primary winding, the secondary winding also encloses the coil tube along its virtual axis. The CWP is electrically floating. The absolute value of the generated PDOS is zero when the movable magnetic medium (MMM) is located at a central tube point (CTP) along the virtual axis.

In a more specific embodiment, the MPDME has a pair of identical balancing spring element A (BSE-A) and balancing spring element B (BSE-B), respectively attached to the ends of the movable magnetic medium (MMM) and the coil tube for automatically returning the MMM position to the CTP when there is no motion and the virtual axis is oriented perpendicular to the gravity axis.

In another specific embodiment, the MPDME has only a movable magnetic medium (MMM) without any spring connected to the coil tube for indicating vibration when the coil tube is oriented in a horizontal plane.

In a more specific embodiment, the interior of coil tube is vacuum or filled with air, oil, or a liquid.

These aspects of the present invention and their numerous embodiments are further made apparent, in the remainder of the present description, to those of ordinary skilled in the art.

BRIEF DESCRIPTION OF THE DRAWINGS

In order to more fully describe numerous embodiments of the present invention, reference is made to the accompanying drawings. However, these drawings are not to be considered limitations in the scope of the invention, but are merely illustrative:

FIG. 1A is a schematic illustration of a simplified micro-magnetic sensor element for sensing a motion such as acceleration, position variation, tile variation, or vibration; and FIG. 1B is a schematic illustration of a further simplified micro-magnetic sensor element for indicating a motion of vibration when the coil tube is oriented in a horizontal plane.

DETAILED DESCRIPTION OF SPECIFIC EMBODIMENTS

The description above and below plus the drawings contained herein merely focus on one or more currently preferred embodiments of the present invention and also describe some exemplary optional features and/or alternative embodiments. The description and drawings are presented for the purpose of illustration and, as such, are not limitations of the present invention. Thus, those of ordinary skill in the art would readily recognize variations, modifications, and alternatives. Such variations, modifications and alternatives should be understood to be also within the scope of the present invention.

For the purpose of simplifying manufacturing process, reducing cost, and achieving the external dimensions of MEMS semiconductors, the present invention provides a method of using a micro-magnetic sensor that generates, by balancing a coil tube's phase floating point, a synchronously varying electronic signal corresponding to a motion such as position variation, acceleration, or vibration of an object that carries the micro-magnetic sensor.

The present invention proposes the placement, inside a non-metallic coil tube, of a movable magnetic medium (MMM) that is a single piece of magnetically permeable ball, cube, cuboid, cylinder, elliptical cylinder, or ellipsoid. The magnetically permeable material can be made of iron, steel, ferro-magnet, permanent magnet, or other magnetically permeable material. The length of the MMM is shorter than the coil tube's interior length for a free movement between the ends of the coil tube. The ends of the coil tube are closed with each end connected to a spring or a springy element of the same spring constant and the same length while the other ends of the two springs are connected to the ends of the movable magnetic medium (MMM) for sensing a motion like acceleration, displacement, tilt, and vibration. However, even if no spring is applied in the coil tube but the coil tube is oriented in a horizontal plane, the device is still capable of indicating vibration. The interior of the tube can be vacuum or filled with air, or liquid. Surrounding the exterior of the coil tube are a primary winding and a secondary winding with surface insulation, such as copper wires coated with paint. The primary winding is a single-section winding helically surrounding the coil tube in either one direction along the tube axis. The secondary winding has two sections of sub-windings having the same number of turns but opposite winding direction. The starting terminals of the two sub-windings are connected together at a central winding point (CWP) that is not grounded. Thus, the ending terminals of the two sub-windings form a pair of symmetric output terminals. For application, a single frequency periodic drive signal is applied to the terminals of the primary winding. Correspondingly, the sensor outputs an electronic signal via the two ending terminals of the secondary winding.

While the coil tube is stationary with its axis oriented parallel to the ground surface, the MMM is located at the mid point along the coil tube axis with the absolute value of the phase differential electronic signal across the two ending terminals approaches zero. However, under a dynamic state of motion or while the coil tube is oriented perpendicular to the ground surface, such as while the MMM inside the coil tube is going through acceleration, position variation, or gravity effect, the two ending terminals of the secondary winding would output an absolute phase differential electronic signal that is non-zero.

The two ending terminals of the secondary winding are connected to a bridge circuit sequentially followed by an amplifier, a filter, an analog to digital converter, and a digital signal processor in series. In this way, a digital micro-magnetic sensor for acceleration, displacement, tilt, and/or vibration is formed.

The benefit of present invention includes having two units of the same sensor share the same input driving signal source. The two coil tubes (of the two sensor units) are oriented perpendicular to each other forming an X-Axis and a Y-Axis. During operation, the thus formed sensor outputs two phase differential electronic signals corresponding respectively to the motion dynamics along X-Axis and Y-Axis. Similarly, by having three identical sensors oriented orthogonally with one another and share the same input driving signal source motion dynamics along X, Y, and Z Axes can be sensed among three mutually perpendicular coil tubes. The thus formed sensor would output three phase differential electronic signals corresponding respectively to X, Y and Z Axis. More specifically, while the coil tubes are going through motion dynamics, the sensor can obtain, through the digital signal microprocessor, digital signals of acceleration, tilt, displacement, and vibration. As examples of application, the thus obtained digital signals can be used in dynamic state control systems, navigation systems, anti-theft systems, fitness equipments, robotic sensors, and electronic gaming machines' dynamic operating systems. This sensor is also structurally simple.

FIG. 1A is a schematic illustration of a simplified micro magnetic sensor (MMS) 16 for acceleration, displacement, tilt, and vibration. The simplified MMS 16 includes: a primary winding 2, serving as the master inductor, and a secondary winding 17, serving as the slave inductor. The primary winding 2 has primary input terminal 1 41 and primary input terminal 2 42 both connected to an External single frequency drive signal source 1. The secondary winding 17 further includes two oppositely wound but otherwise identical secondary sub-winding A (SSW-A) 10 and secondary sub-winding B (SSW-B) 11. They are joined at a Central Winding Point (CWP) 12 and are wound with secondary differential output terminal 1 (SDOT-1) 18 and secondary differential output terminal 2 (SDOT-2) 19. As another part of the simplified MMS 16, a magnetically permeable dynamic media element (MPDME) 23 is placed near primary winding 2 and secondary winding 17. In an embodiment, the MPDME 23 can simply be a central core enclosed by the primary winding 2 and further enclosed by SSW-A 10 and SSW-B 11 sharing the MPDME 23 as a magnetic medium for electro-magnetic coupling. Upon connecting the External single frequency drive signal source 1 to primary input terminals 41 and 42, a phase-based differential output signal (PDOS) 20 is generated between SDOT-1 18 and SDOT-2 19 at a Secondary Winding Output port 14. Consequently, upon a movement of the single-piece Sensor Core 21 of the MPDME 23, the simplified MMS 16 generates a corresponding PDOS 20 at the Secondary Winding Output port 14.

The MPDME 23 includes: a sealed nonmetallic Coil Tube 15 surrounded by primary winding 2 and further surrounded by both SSW-A 10 and SSW-B 11, and a single-piece Sensor Core 21 disposed inside the Coil Tube 15 for a free sliding movement along its axis direction as illustrated by movable direction of the single-piece Sensor Core 13 under an inertial force. The single-piece Sensor Core 21 is made of a magnetically permeable movable magnetic medium (MMM) 345.

The primary winding 2 is centered with respect to the single-piece Sensor Core 21 along its movable direction 13. Likewise, the SSW-A 10 and SSW-B 11 are centered with respect to the single-piece Sensor Core 21 along its movable direction 13 as well. That is, SSW-A 10 and SSW-B 11 are symmetrically connected via the central winding point (CWP) 12. Other than the winding directions, the detailed winding geometries, including wire gauge, coil diameter, coil pitch and number of turns, of SSW-A 10 and SSW-B 11 are configured to be the same. Additionally, magnetic Pole 1 8 of the SSW-A 10 and magnetic Pole 1 9 of the SSW-B 11 are placed symmetric with respect to the CWP 12 as well. Thus magnetic Pole 1 8 defines a Secondary Differential Output Terminal 2 (SDOT-2) 19 while magnetic Pole 1 9 defines a Secondary Differential Output Terminal 1 (SDOT-1) 18. The CWP 12 is electrically floating. As a result, the absolute value of the Phase-based Differential Output Signal (PDOS) 20 approaches zero while the movable magnetic medium (MMM) 345 stays balanced at the central tube point (CTP) 22 that is located at the center along the axis of coil tube 15.

The MPDME 23 further includes a pair of identical balancing spring element A (BSE-A) 6 and balancing spring element B (BSE-B) 7 respectively attached to the ends of single-piece Sensor Core 21 and coil tube 15. The BSE-A 6 and BSE-B 7 are made with equal axial length and spring constant to balance, under either a weak compression force or a weak expansion force, the MMM 345 at the CTP 22 in a static environment. In other words, the pair of BSE-A 6 and BSE-B 7 would automatically return the position of MMM 345 to CTP 22 when there is no motion and when the movable direction 13 of the MMM 345 is oriented perpendicular to the gravity axis or direction.

The interior of coil tube 15 can be vacuum or filled with air, oil or a liquid.

FIG. 1B is a schematic illustration, to those skilled in the art, of a further simplified micro magnetic sensor (MMS) 16 that is the same as the one shown in FIG. 1A except that the pair of springs BSE-A 6 and BSE-B 7 have been removed for indicating vibration when the coil tube 15 is oriented in a horizontal plane.

Throughout the description and drawings, numerous exemplary embodiments were given with reference to specific configurations. It will be appreciated by those of ordinary skill in the art that the present invention can be embodied in numerous other specific forms and those of ordinary skill in the art would be able to practice such other embodiments without undue experimentation. For example, although this application describes a single-axis and a tri-axis micro-magnetic sensor systems for acceleration, position, tilt, and vibration, the invention is equally applicable for measuring the speed of a matter and is expandable into a general multi-axis micro-magnetic sensor system for physical measurement such as acceleration, speed, displacement, position, tilt, and vibration. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

What is claimed are:

1. A simplified micro magnetic sensor (MMS) for acceleration, position, tilt, and vibration comprising:
    a primary winding and a secondary winding wherein the primary winding has two primary input terminals and the secondary winding is wound with two secondary differential output terminals SDOT-1 and SDOT-2; and
    a magnetically permeable dynamic media element (MPDME) placed near both the primary winding and the secondary winding so as to effect a transformer coupling there between in that, upon connecting the primary input terminals to an external single frequency drive signal source, a phase-based differential output signal PDOS is generated between SDOT-1 and SDOT-2 and, upon a movement of the MPDME due to acceleration, position, tilt or vibration, the MPDME causes a corresponding response of the PDOS; where the MPDME comprises:
    a sealed nonmetallic coil tube enclosed by both the primary winding and the secondary winding but insulated there from; and
    a sensor core, disposed inside the coil tube for a free sliding movement along its axis under an inertial force, made of a magnetically permeable material
    whereby the MPDME causes a corresponding response of the PDOS through a movement of the sensor core.

2. The simplified MMS of claim 1 wherein the shape of the sensor core is ball, cube, cuboid, cylinder, elliptical cylinder or ellipsoid.

3. The simplified MMS of claim 2 wherein the sensor core has the shape of a ball with diameter in the range of from about 0.2 mm to about 10 mm.

4. The simplified MMS of claim 1 wherein the magnetically permeable material is a metallic material.

5. The simplified MMS of claim 4 wherein the metallic material is steel, iron, ferromagnet or permanent magnet.

6. The simplified MMS of claim 1 wherein:
    the primary winding is centered along the axis of coil tube; and
    the secondary winding comprises two secondary sub-windings SSW-a and SSW-b with matched winding geometry joined at a central winding point (CWP) thus defining the SDOT-1 and SDOT-2, wherein the CWP being electronically floating, the winding geometry of SSW-a and SSW-b being, referencing the CWP, symmetric with respect to each other such that the absolute value of PDOS approaches zero while the sensor core stays balanced at a central tube point (CTP) located at the center of the coil tube axis.

7. The simplified MMS of claim 6 wherein the MPDME further comprises a pair of balancing spring elements BSE-A and BSE-B, of equal axial length and spring constant, respectively attached to the ends of the sensor core and coil tube to balance, under either a weak compression force or a weak expansion force, the sensor core at the CTP in a static environment.

8. The simplified MMS of claim 7 wherein the interior of coil tube is vacuum or filled with air, oil or a liquid.

* * * * *